US008775933B2

(12) United States Patent
Harrington

(10) Patent No.: US 8,775,933 B2
(45) Date of Patent: Jul. 8, 2014

(54) SYSTEM AND METHOD FOR MANAGING DYNAMIC DOCUMENT REFERENCES

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2690 days.

(21) Appl. No.: 11/459,372

(22) Filed: Jul. 24, 2006

(65) Prior Publication Data
US 2007/0156743 A1 Jul. 5, 2007

Related U.S. Application Data

(60) Provisional application No. 60/753,051, filed on Dec. 22, 2005.

(51) Int. Cl.
G06F 3/00 (2006.01)

(52) U.S. Cl.
USPC .......................................................... 715/277

(58) Field of Classification Search
USPC ................... 715/234, 243, 254, 255, 277
See application file for complete search history.

(56) References Cited

U.S. PATENT DOCUMENTS

| 6,370,553 | B1 | 4/2002 | Edwards et al. |
| 6,397,231 | B1 | 5/2002 | Salisbury et al. |
| 6,540,142 | B1 | 4/2003 | Alleshouse |
| 6,644,322 | B2 * | 11/2003 | Webb ........................... 128/899 |
| 6,655,593 | B2 | 12/2003 | Alleshouse |
| 6,908,034 | B2 | 6/2005 | Alleshouse |
| 6,912,538 | B2 | 6/2005 | Stapel et al. |
| 7,315,858 | B2 * | 1/2008 | Potok et al. ........................... 1/1 |
| 7,349,959 | B2 * | 3/2008 | Imamura et al. .............. 709/223 |
| 7,404,142 | B1 | 7/2008 | Tischer |
| 2002/0040353 | A1 | 4/2002 | Brown et al. |
| 2002/0152244 | A1 * | 10/2002 | Dean et al. .................... 707/530 |
| 2003/0051144 | A1 | 3/2003 | Williams |
| 2003/0120949 | A1 | 6/2003 | Redlich et al. |
| 2003/0184789 | A1 | 10/2003 | Komaki |
| 2004/0145593 | A1 | 7/2004 | Berkner et al. |
| 2004/0148571 | A1 | 7/2004 | Lue |

(Continued)

OTHER PUBLICATIONS

"XML Inclusions (XInclude) Version 1.0," Dec. 20, 2004, available at: http://www.w3.org/TR/2004/REC-xinclude-20041220.*

(Continued)

Primary Examiner — Kyle Stork
(74) Attorney, Agent, or Firm — Michael J. Nickerson; Basch & Nickerson LLP

(57) ABSTRACT

Document fragments are managed by the use of fragment objects. Fragment objects contain a reference to a portion of a source document. Referencing documents contain a reference to a fragment object which delivers the content of the fragment of the source document to the referencing document. The source document can be directly updated through updating the fragment of the source document contained in the referencing document via the use of the fragment object. Source document deletion is controlled by storing the references to the source document by fragment objects so that no fragment object has a reference to a nonexistent source document. A process for organizing document fragments within a document management system wherein source documents comprise duplicates of the document fragments includes replacing a duplicate fragment with a reference to a single fragment object the fragment object including a reference to a fragment of a source document and an object class method for deletion of the fragment object including instructions to remove the reference to the fragment object from the metadata of the source document to which the fragment object refers.

20 Claims, 6 Drawing Sheets

(56) References Cited

U.S. PATENT DOCUMENTS

2004/0205615 A1* 10/2004 Birder .......................... 715/523
2005/0150953 A1    7/2005 Alleshouse
2005/0244140 A1   11/2005 Blacquiere
2007/0150807 A1    6/2007 Harrington
2007/0156744 A1    7/2007 Harrington
2007/0156745 A1    7/2007 Harrington
2007/0156768 A1    7/2007 Harrington et al.

OTHER PUBLICATIONS

Unofficial file history for U.S. Appl. No. 11/459,371 as of Dec. 8, 2008.
Unofficial file history for U.S. Appl. No. 11/459,373 as of Dec. 8, 2008.
Unofficial file history for U.S. Appl. No. 11/459,376 as of Dec. 8, 2008.
Unofficial file history for U.S. Appl. No. 11/459,374 as of Dec. 8, 2008.
Unofficial file history for U.S. Appl. No. 60/753,051 as of Dec. 8, 2008.
Unofficial file history for U.S. Appl. No. 11/459,371 between Dec. 8, 2008 and Jun. 2, 2009.
An unofficial the prosecution history of U.S. Appl. No. 11/459,371 between Jun. 2, 2009 and Nov. 2, 2009.
An unofficial the prosecution history of U.S. Appl. No. 11/459,373 between Dec. 11, 2008 and Dec. 9, 2009.
An unofficial the prosecution history between Dec. 8, 2008 and Apr. 1, 2010 of U.S. Appl. No. 11/459,374.
An unofficial the prosecution history between Dec. 8, 2008 and Mar. 22, 2010 of U.S. Appl. No. 11/459,376.
An unofficial the prosecution history between Dec. 8, 2009 and Mar. 23, 2010 of U.S. Appl. No. 11/459,373.
"XML Inclusions (XInclude) Version 1.0," Dec. 20, 2004, available at: w3.org/TR/2004/REC-xinclude-20041220.
An unofficial the prosecution history of U.S. Appl. No. 11/459,376 between Mar. 22, 2010 and Jul. 27, 2010.

* cited by examiner

SYSTEM AND METHOD FOR MANAGING DYNAMIC DOCUMENT REFERENCES

PRIORITY INFORMATION

The present application claims priority, under 35 U.S.C. §119(e), from U.S. Provisional Patent Application Ser. No. 60/753,051, filed on Dec. 22, 2005. The entire content of U.S. Provisional Patent Application Ser. No. 60/753,051, filed on Dec. 22, 2005, is hereby incorporated by reference.

BACKGROUND

A document is a conventional unit of information exchange. The development of electronic documents has increased the ease and flexibility with which documents can be altered, separated, and reorganized. Documents in electronic form can contain references to other electronic documents or parts of other electronic documents. Unlike conventional printed documents, an electronic document with a reference to another electronic document carries the possibility of new applications involving the dynamic lookup of the content of other documents.

Standards such as Extensible Markup Language, Extensible Markup Language Pointer, and Extensible Markup Language Inclusions are examples of tools that can be used to implement a system of managing dynamic document references. The possibility of embedding, within a document, dynamic references to other documents enables the concept of managing a set of documents as a set of document fragments. The document fragments can be referenced directly instead of indirectly by first traversing a reference to the full document that originally contained the fragment. The full document that originally contained the fragment can itself be referenced directly or indirectly.

Conventionally, document components can be managed directly, like small documents. In these conventional systems documents are stored as sections.

It has long been possible to specify portions or fragments of simple text documents where a fragment can be specified by a file offset and size, but now there are mechanisms for specifying fragments of structured documents. An example is the Extensible Markup Language Pointer standard that can reference portions of an Extensible Markup Language encoded document. Furthermore, there are standards such as Extensible Markup Language Inclusions that allow fragments of documents to be inserted into other documents.

Document fragments then, are becoming the new unit of information. Document fragments provide the capability of reuse of information and content. Document fragments allow documents to be dynamic; when the information in the source document is updated or changed, those changes are seen in all the documents that include the altered fragments. However, the infrastructure to deal with componentized documents and document fragments is still being developed.

For example, an identified fragment may be particularly useful for inclusion in multiple documents. It would then be desirable to have the means to find a previous definition of that fragment and copy or paste that fragment into the new document. Other examples include: organizing fragments for better management and identification, associating metadata with a document fragment extending the use of fragments beyond the Extensible Markup Language document world, propagating changes from document fragments back to the source document and managing references to deleted source documents.

Furthermore, it is desirable to have the ability to perform the above-mentioned tasks even if the user only has read access to the source documents of the document fragments.

It may be desirable to include the referenced document fragment in a form or format that is different from its form in the original source document. One example is translation into another language. Another example is change of display font or printer font. Another example is summarization where a lengthy fragment of a document is transformed so that only a summary appears in the referencing document.

It may be desirable to edit or revise a document including the referenced text of a document fragment. One way to make the revision is by making a copy of the referenced content and editing the copy. But this approach sacrifices the ability to dynamically maintain consistency with the source document.

Updating of all references to the source document is also necessary to dynamically maintain consistency with the source document when changes to a referenced fragment must be propagated back to the source document. A reference must describe both the location and scope of the referenced content, but editing the content could alter its size and scope. This might mean having to revise all references to the inserted content, even though these can occur in documents that the editor is unaware of. An additional problem is determining how to know what the boundary is between the revised referenced content and the revised referencing document after editing has taken place.

What is needed is the ability to more flexibly propagate changes back to a source document from a document fragment that is coupled to the source document only by the use of a reference within a referencing document.

Documents can include portions of other documents by reference. If, however, the referenced document is deleted, the reference is left dangling. What is needed is a means to tell if a document is referenced in order to know if it is safe to delete the document, or a means to revise references so that the references reference something other than the deleted object.

A document may include content with a variety of access sensitivities. Some parts of the document may be suitable for general access, while other portions will need to have the access restricted. One way to impose the restriction is by encryption. Once a document is encrypted, the document can conventionally be made available without much concern or reservation since only a select group of users can decrypt the document. However, it may be desirable to be able to select and use less sensitive portions of the document in other documents with less restrictive access, while other portions will need to have the access restricted. It is possible to employ several encryptions within the document, but this would be inconvenient to the viewer. To access the document as a whole, the most restrictive rules must prevail.

A document repository may contain legacy documents where content has been shared by copy and paste editing. It would be desirable to be able to automatically identify these common content elements so that the common content elements might be replaced with a document or document fragment reference.

Therefore, it is desirable to provide a system and method for managing document fragments that overcome the above-mentioned difficulties.

BRIEF DESCRIPTION OF THE DRAWINGS

The drawings are only for purposes of illustrating an embodiment and is not to be construed as limiting, wherein.

DETAILED DESCRIPTION

Figure 1:
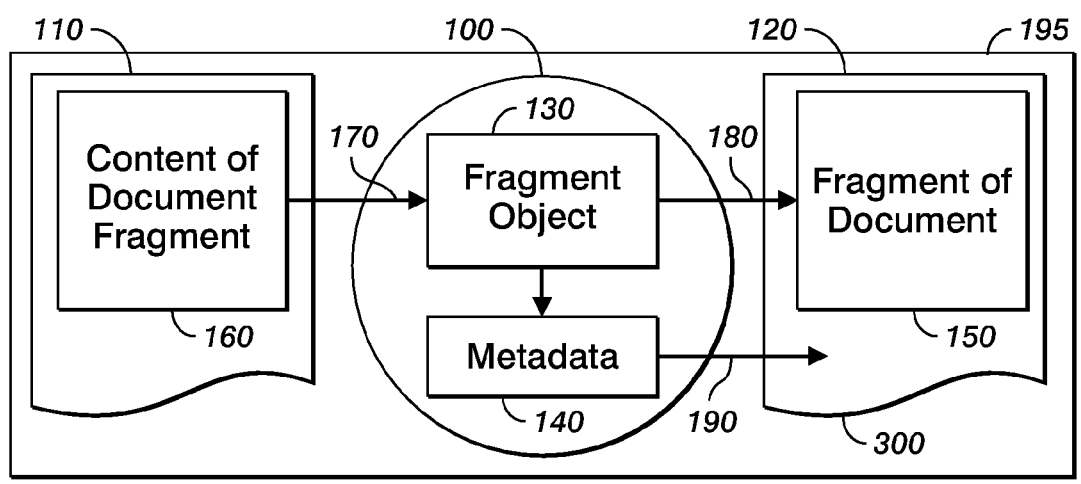
FIG. 1 is a block diagram illustrating the system described herein.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

According to aspects illustrated herein, there is provided a system for managing documents and document fragments including: a digital computer system, a source document, a referencing document, an object repository operatively coupled to the computer system and a fragment object operatively coupled to the object repository. The fragment object includes: a reference to a fragment of a source document and an object class method for deletion of the fragment object the object class method including instructions to remove the reference to the fragment object from the metadata of the source document to which the fragment object refers. The digital computer system includes: a central processing unit, a random access memory, a persistent media memory an input device and an output device. The object repository includes: the metadata of a source document and a library of executable object class methods.

According to aspects illustrated herein, there is further provided a process for retrieving document fragments including: accessing a referencing document, requesting a document fragment from a fragment object, and accessing a fragment of a source document. According to aspects illustrated herein, there is further provided a process for updating a source document including: retrieving a referencing document, accessing a fragment object, identifying the content of the source document associated with the fragment object, editing the content from the source document associated with the fragment object, invoking the fragment object to update the source document and updating the source document according to the edit of the fragment of the source document associated with the fragment object.

According to aspects illustrated herein, there is further provided a process for deleting a source document including: requesting the deletion of a source document from a document management system and examining the metadata of the source document to determine whether the source document is referenced by a fragment object.

According to aspects illustrated herein, there is further provided a process for organizing document fragments within a document management system wherein source documents include duplicates of the document fragments the process including: identifying a structurally distinct fragment of a document, computing the checksum of a structurally distinct fragment of a document, identifying a set of duplicate document fragments and replacing a duplicate fragment with a reference to a single fragment object.

According to aspects illustrated herein, there is further provided a process for creating a fragment object including: invoking the creation of a fragment object from an object repository, accessing a source document, using information obtained from the user to generate a reference to a fragment of the source document in the data of the fragment object updating the metadata of the source document to record the new reference to the source document and storing the data of the fragment object in a document management system.

According to aspects illustrated herein, there is further provided a process for causing a referencing document to reference a document fragment including: selecting a document fragment from a document management system and adding a reference to a fragment object referring to the selected document fragment to the referencing document.

In reference now to FIG. 1, a block diagram illustrating a system for managing document fragments is shown. A digital computer 195 includes an object repository 100, a source document 120 and a referencing document 110. An object repository 100 includes the metadata 140 of a source document 120. The object repository 100 also includes a fragment object 130 that contains a combined reference 180 to the metadata 140 of a source document 120 and a fragment 150 of the source document 120. It is noted that the source document 120 need not physically reside within the object repository 100, since the metadata 140 of the source document 120 provides sufficient information to access the source document 120. The fragment object 130 references a fragment 150 of the source document 120 utilizing a reference 180 the metadata 140 of the source document 120. The metadata of the source document includes a reference 190 to the source document itself.

It is noted that the fragment object 130 may include an object class method for encrypting and decrypting document data. An object class method for encryption or decryption of document data allows the user to access encrypted source document data. Such an object class method would also allow the data of the fragment object itself to be encrypted and decrypted. An object class method for encryption or decryption will also allow the encryption of entire source documents and parts of source documents.

A referencing document 110 includes a reference 170 to a fragment object 130. The fragment object 130 provides to the referencing document 110 the content 160 of the document fragment 150. It is noted that the fragment object 130 may include an object class method to transform the data of the source document. This would allow the original source document data to be presented in a different form in the referencing document than the form in the original source document. An object class method for changing the form of the source document data may allow, for example, changing of the display font or printer font, translation into another language or may allow summary of content. It is noted that many other features and functions or alternatives thereof may be implemented in an object class method to change the original form of the source document data which are also intended to be encompassed herein.

The fragment object 130 may also include an object class method for enforcing digital access rights. An object class method for enforcing digital access rights may deny access to a document fragment, the fragment object or the source document depending on the rights assigned to the user. It is noted that object class methods for enforcing digital access rights and for encrypting and decrypting document data can be used together to implement a document data security policy. Methods of user identification and enforcement of digital access rights, along with algorithms for encryption and decryption are known to those skilled in the art and will not be discussed in detail here.

The fragment object 130 may also include an object class method for utilizing an Extensible Markup Language encoded document. Such an object class method would enable the use of the Extensible Markup Language Pointer standard that can reference portions of an Extensible Markup Language encoded document. An object class method for utilizing Extensible Markup Language would also enable the use of Extensible Markup Language Inclusions; which allows fragments of documents to be inserted in other documents.

It is noted that the fragment object 130 herein disclosed may also be used with documents that are not encoded in Extensible Markup Language.

A process for retrieving document fragments 150 within a referencing document 110 includes accessing a referencing document 110. It is noted that a referencing document may be accessed by a conventional document editor. Conventional document editors such as Microsoft Word® are capable of invoking objects such as the fragment object 130 herein disclosed.

Further, the process for retrieving document fragments 150 within a referencing document 110 includes requesting a document fragment from a fragment object 130. When the fragment object 130 is invoked with a request to display the document fragment 150, the metadata 140 of the source document 120 is examined and the source document 120 is accessed. The fragment 150 of the source document 120 that is defined by the fragment object 130 is accessed and copied into the referencing document 110 to be displayed therein.

It is noted that retrieval of the document fragment may include transforming the data of the document fragment from its native format as described above. Retrieval of the document fragment may also include decrypting the data of the document fragment as described above if that data is encrypted. Retrieval of the document fragment may also include enforcing digital access rights as described above.

A process for updating a source document 120 includes retrieving a referencing document 110 as described above. The process further includes accessing a fragment object 130 from within a referencing document 110 as described above. The content of the document fragment 150 that is displayed within the referencing document 110 is identified in the referencing document 110 by its position or other conventional means. The process further includes editing the content of the document fragment 160 within the referencing document 110.

Further, the process for updating a source document 120 includes invoking the fragment object 130 with a request to update the source document 120 according to the edit of the fragment 160 of the source document. When the fragment object 130 receives the request, the fragment object modifies the fragment 150 of the source document 120 associated with the fragment object 130. It is noted that once the source document 120 is modified, the fragment object 130 will refer to the modified fragment 150. Therefore, all referencing documents 110 that refer to the fragment object 130 will automatically refer to the modified fragment 150.

Since the size of the fragment 150 may be changed by the edit, the fragment object 130 must not use the conventional position and offset method of identifying the fragment 150. Rather, the fragment 150 must be identified in a way that focuses as directly as possible on the semantics of what is being sought, such as a reference to a numbered paragraph or a labeled section of a document such as a preamble.

A process for deleting a source document 120 includes requesting the deletion of a source document 120 from the object repository 100 that includes the metadata of the source document. It is noted that any conventional means may be used to invoke the appropriate object class method of the object repository 100 to initiate a source document deletion request.

Further, the process for deleting a source document 120 includes examining the metadata 140 of the source document 120 to determine whether the source document 120 is referenced by a fragment object 130. It is noted that when a fragment object 130 is created within the object repository 100, the metadata 140 of the source document 120 to which the fragment object 130 refers is updated to record the new reference 180 to the source document 120. It is also noted that when a fragment object 130 is deleted, the metadata 140 of the source document 120 to which the fragment object 130 refers is updated to record the removal of the reference 180.

If, through examining the metadata of the source document, it is determined that the source document 120 being deleted still has fragment objects 130 referring to the source document, it is possible to postpone the deletion of the source document 120 until all references 180 to the source document 120 from a fragment object 130 are first deleted. Marking the source document 120 for future deletion allows this postponement to take place. Marking the source document 120 for future deletion also allows the referencing fragment objects 130 to determine that the source document 120 is marked for future deletion. Depending on the use or the environment of the referencing document 110, the user of the referencing document 110 may wish to see whether the source document 120 is marked for future deletion.

Further, the process for deleting a source document 120 may include physically deleting the source document 120. It is noted that physically deleting the source document 120 is not necessary to remove the data of the source document from the referencing fragment objects. Since a fragment object 130 references the source document 120 through the metadata 140 of the source document 120, only the metadata 140 of the source document 120 need be marked as deleted. However, the physical deletion of the source document 120 along with physical deletion of the metadata 140 of the source document may also be included in the process.

Further, the process for deleting a source document 120 may include marking a fragment object 130 that refers to the source document 120 to signify that the source document 120 is deleted. It is noted that if the metadata 140 of the source document 120 is marked as deleted, it is not necessary to also mark the fragment object 130. However, if the metadata 140 of the source document 120 is physically deleted, such a marking would be necessary if the user of the document fragment 150 wished to know positively whether the source document 120 was deleted. It would not be enough to simply allow a dangling reference to a document fragment to persist.

Further, the process for deleting a source document 120 may include copying the actual document data of a fragment referenced by fragment object 130 into the data of the fragment object 130 itself. This will allow the source document 120 to be deleted while a reference to a fragment of that source document is still maintained by preserving the data of the fragment of the source document 120 that is referenced by the fragment object 130. Copying the actual document data 150 of a document fragment into a fragment object 130 allows the source document 120 to be deleted transparently such that all referencing documents 110 that refer to fragments 150 of the source document 120 are virtually unaffected.

A process for organizing document fragments includes identifying a structurally distinct fragment 150 of a document 120. Further, the process for organizing document fragments includes computing a checksum for each fragment so identified. The checksum enables the fragments to be segregated into groups that are natural candidates for being identical. The members of each group so identified can be compared with each other to determine if the members of the group are indeed identical.

A process for creating a fragment object 130 includes invoking the creation of a fragment object 130 from an object repository. It is noted that any conventional means may be used to invoke the appropriate object class method of the object repository 100 to initiate the creation of a fragment object. The object class method for creating the fragment object is utilized to access a source document 120. Information obtained from the user is used to generate a reference 180 to a fragment 150 of the source document 120 in the data of the fragment object 130.

The process further includes updating the metadata 140 of the source document 120 to record the new reference 180. The metadata 140 may be updated by simply incrementing a reference count. The metadata 140 may also be updated by adding a reference to the fragment object 130 to the metadata 140 of the source object 120. It is noted that various presently unforeseen or unanticipated alternative means for updating the metadata may be devised by those skilled in the art and are also intended to be encompassed herein.

The process further includes storing the data of the fragment object 130 in the object repository 100 of the document management system.

A process for causing a referencing document 110 to reference a document fragment 150 includes selecting a document fragment 150 from a document management system. It is noted that any conventional means may be used to invoke the appropriate object class method of the object repository 100 to initiate a document fragment selection dialog. It is noted that a referencing document may be accessed by a conventional document editor. Conventional document editors are capable of invoking object class methods such as the fragment selection dialog 130 herein disclosed. The fragment selection dialog will conclude with the incorporation of a reference 170 to a fragment object 130 into the referencing document 110.

Figure 2:
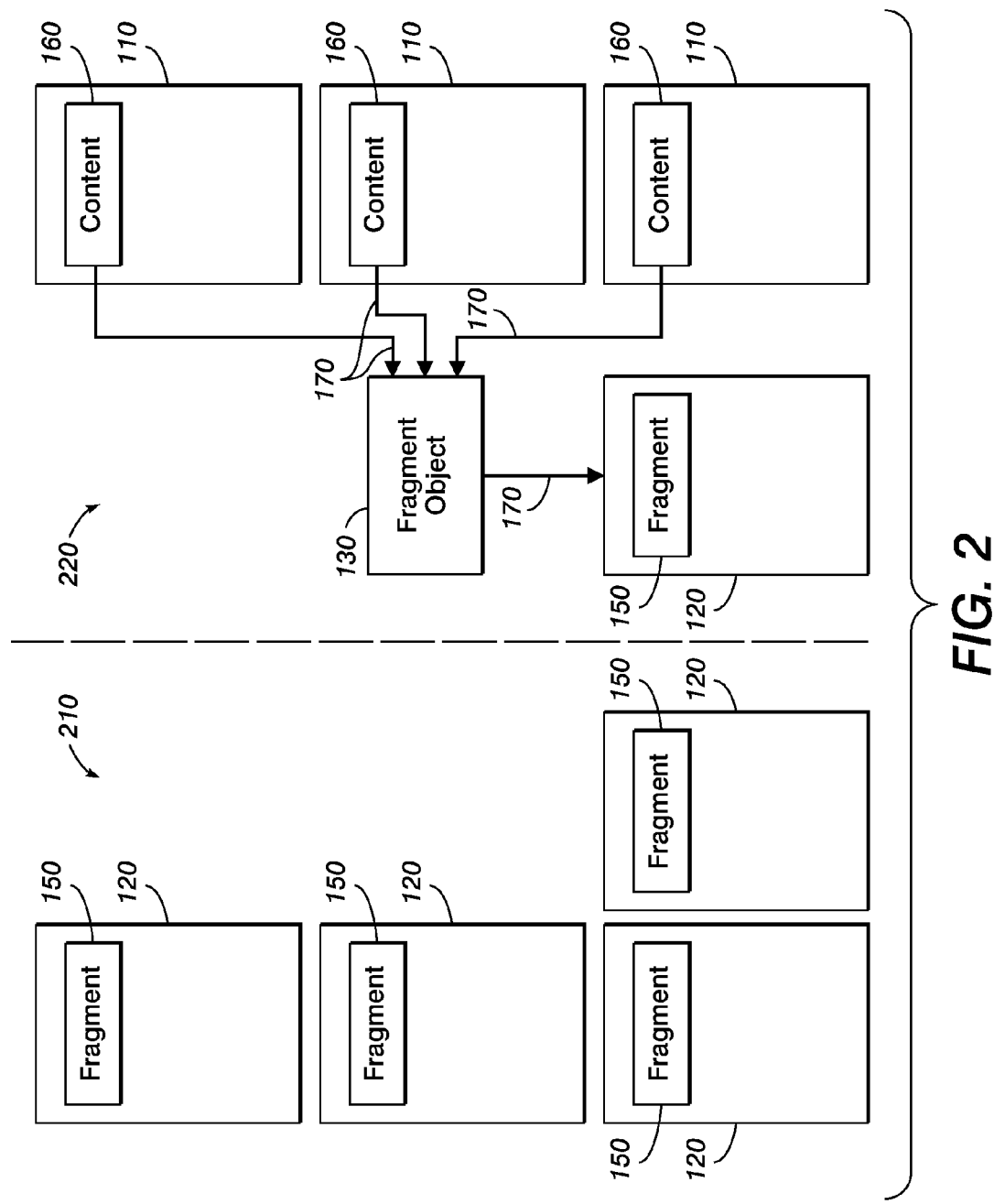
FIG. 2 is a block diagram illustrating a result of a process for organizing document fragments within a document management system.

In reference now to FIG. 2, a result of the process for organizing document fragments within a document management system is illustrated. Situation 210 illustrates four source documents 120 each containing a fragment 150 where each of the fragments is identical. Situation 220 illustrates the same four documents 110, 120. Three of the documents 110 have the identical fragment replaced with a reference 170 to a fragment object 130. The fragment object 130 in turn contains a reference to a fragment 150 of the fourth document 120 which has now become a source document 120. The other documents 110 have now become referencing documents 110. Situation 220 allows greater space efficiency, especially as the document fragment 150 may be large. Situation 220 also allows greater control of content since all changes to the document fragment 150 will automatically be propagated to all referencing documents 110 as well as other documents that may later reference the document fragment 150.

Figure 3:
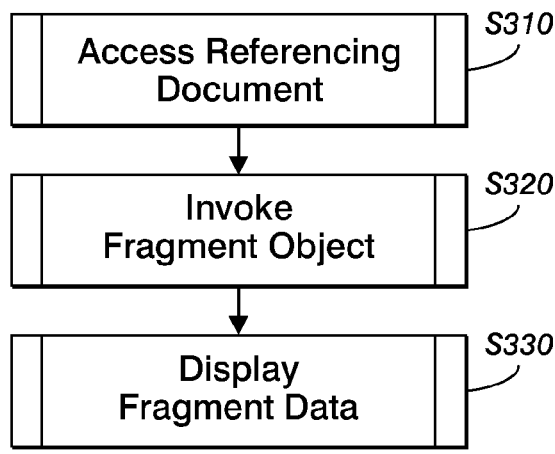
FIG. 3 is a flowchart describing a process for retrieving a document fragment.

In reference now to FIG. 3, a flowchart describing a process for retrieving a document fragment is illustrated. At Step S310 a referencing document is accessed. It is noted that any conventional means for accessing a referencing document may be used. At Step S320 the fragment object is invoked with a request to display the document fragment to which the fragment object refers. It is noted that each time a referencing document is displayed; the fragment object may be invoked in this way.

At Step S330 the fragment object displays the data of the document fragment. It is noted that displaying the document fragment may include transforming the data of the document fragment from its native format as described above. Displaying the document fragment may also include decrypting the data of the document fragment as described above if that data is encrypted. Retrieval of the document fragment may also include enforcing digital access rights as described above.

Figure 4:
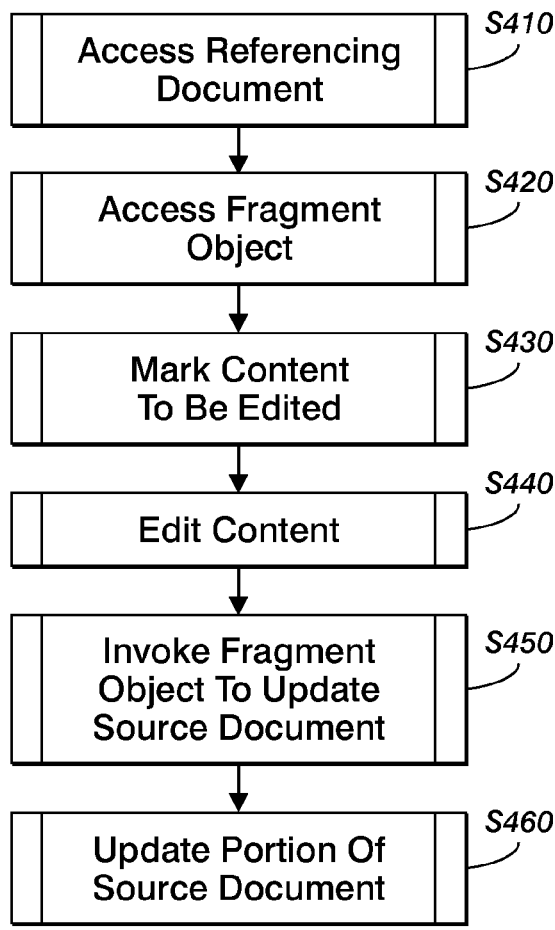
FIG. 4 is a flowchart describing a process for updating a source document.

In reference now to FIG. 4, a flowchart describing a process for updating a source document is illustrated. At Step S410 a referencing document is accessed. It is noted that any conventional means for accessing a referencing document may be used. At Step S420 then, a fragment object, which is referenced in the referencing document, is accessed.

It is noted that accessing the fragment object may include transforming the data of the document fragment from its native format as described above. Accessing the fragment object may also include decrypting the data of the document fragment as described above if that data is encrypted. Accessing the fragment object may also include enforcing digital access rights as described above.

At Step S430 source document content to be edited that is provided by the fragment object is distinguished from the content of the referencing document. It is noted that any conventional means to distinguish source document content from referencing document content may be used such as inserting invisible tokens into the referencing document.

At Step S440 the content of the source document presented by the fragment object in the referencing document is edited. At Step S450 the fragment object is invoked with a request to update the content of the source document. It is noted that the fragment object may be invoked by any conventional means. The fragment object may be invoked automatically whenever the document editor performs a "save" of the referencing document. The fragment object may be invoked upon closure of the referencing document.

At Step S460 the fragment object updates the portion of the source document to which the fragment object refers according to the edit performed in Step S440. It is noted that updating the source document may include decrypting the data if the data of the source document is encrypted. Updating the source document may also include transforming the data back to its native form if the data of the source document was transformed by the fragment object for inclusion in the referencing document. Updating the source document may also include enforcing digital access rights. For example, if the user of the referencing document has read permission but not write permission, the edit would be rejected.

Figure 5:
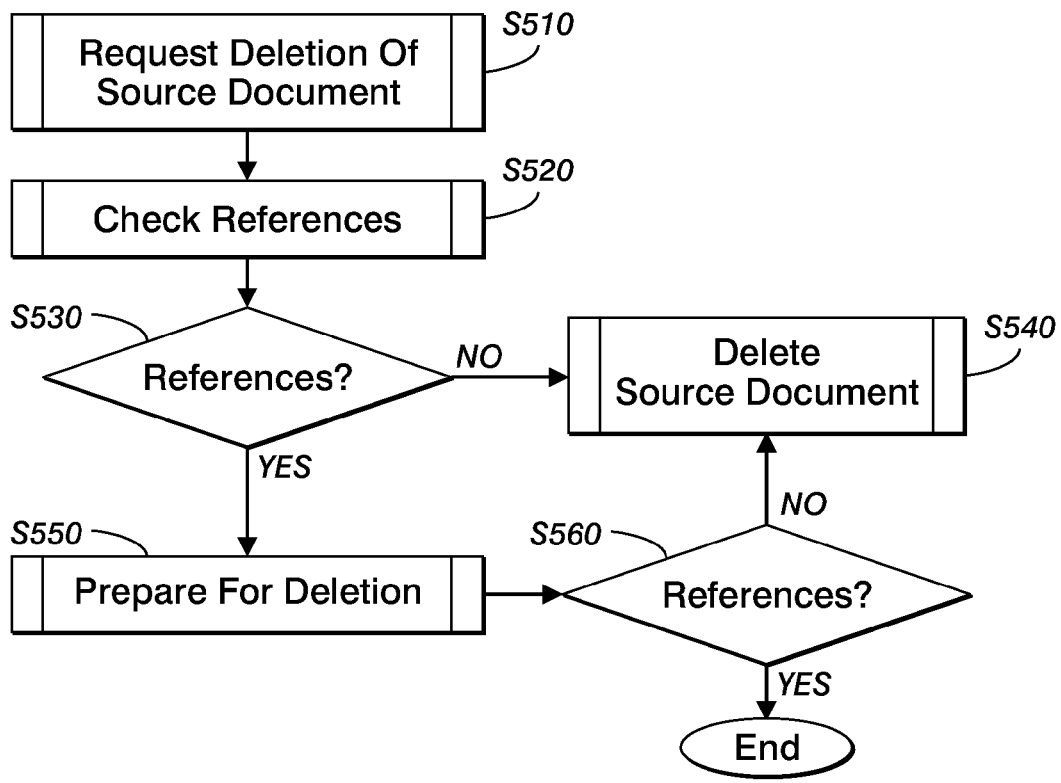
FIG. 5 is a flowchart describing a process for deleting a source document.

In reference now to FIG. 5, a flowchart describing a process for deleting a source document is illustrated. At Step S510 a document management system is invoked with a request to delete a source document. It is noted that the document management system may be invoked by any conventional means including accessing the source document in a document editor and requesting its deletion. Another conventional means of requesting the deletion of a source document is to use a deletion command from a file management system. At Step S520 the metadata of the source document is examined to determine whether the source document is referenced by a fragment object. It is noted that regardless of the means used to request deletion of the source document, an examination of the metadata of the source document will take place as a result.

In order to solve the problem of "dangling references" as described above, actual physical deletion of a source document or the metadata of the source document will not take place until a decision regarding existing references can be made. The decision may be automated in several ways. One way to automate the decision is to mark the metadata of the source document for future deletion. This will enable existing references to continue to retrieve data from the source document until such time as all such references are themselves first deleted. Another way to automate the decision is to mark the metadata of the source document to show that the source document is deleted. This would allow the fragment object to positively report the deletion of the source document when invoked. Still another way to automate the decision is to copy the data of the source document that is referenced by each of the fragment objects that reference the source document to each of those fragment objects that reference the source document. Then, it would be safe to delete the source document because the fragment object no longer needs the source document to deliver data when the fragment object is invoked.

At Step S530, an automated decision based on the existence of references to the source document is taken. If there are no existing references to the source document, control passes to Step S540. At Step S540, the source document is physically deleted. It is noted that Step S540 may also include the physical deletion of the metadata of the source document since there are no existing references. At Step S540 the process is complete.

If there are existing references to the source document, control passes to Step S550. At Step S550, the metadata of the source document may be marked for future deletion or marked as deleted as described above. Also, at Step S550, the source document data that is referenced by the fragment objects may be copied into the data of the fragment objects themselves, in preparation for the physical deletion of the source document. Copying data into the fragment objects eliminates the need for a reference to the source document, therefore, the fragment object is no longer considered to be referencing the source document, once the source document's data is copied into the fragment object.

At Step S560, the metadata of the source document is once again examined and if, at this point there are no references to the source document existing in any fragment objects, the source document can be physically deleted. If there are no existing references in a fragment object to the source document, control passes back to Step S540. It is noted that, at Step S540, the source document is physically deleted. The metadata of the source document may also be deleted at Step S540. If there are still references to the source document in existence at the Step S560, the process is complete.

Figure 6:
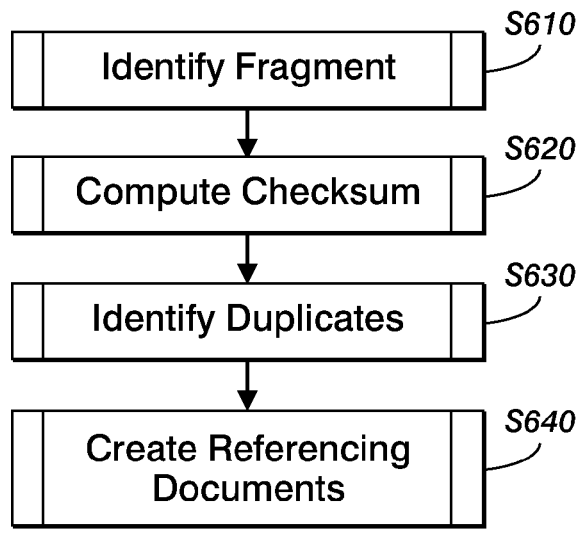
FIG. 6 is a flowchart describing a process for organizing document fragments within a document management system.

In reference now to FIG. 6, a flowchart describing a process for organizing document fragments within a document management system is illustrated. At Step S610, a structurally distinct fragment of a document is identified. Such a structurally distinct fragment may be identified by any conventional means such as Extensible Markup Language encoding, Hypertext Markup Language encoding or a file position template.

At Step S620, the checksum of each structurally distinct fragment of an object identified in Step S610 is computed. It is noted that the checksums computed at Step S620 are indexed to the particular document fragments to which the checksums refer.

At Step S630, a set of duplicate fragment objects is identified using the checksums computed at Step S620 as a starting point. If two checksums are not identical then the fragments the checksums represent are definitely not identical. If two checksums are identical, then the two fragments must be compared byte by byte to determine if the two fragments are identical.

At Step S640, all but one of documents containing duplicate fragments are changed from source documents to referencing documents. Also, a fragment object is created with a reference to the fragment as the fragment still exists in one of the documents. The other documents that were changed to referencing documents now contain a reference to the new fragment object.

Figure 7:
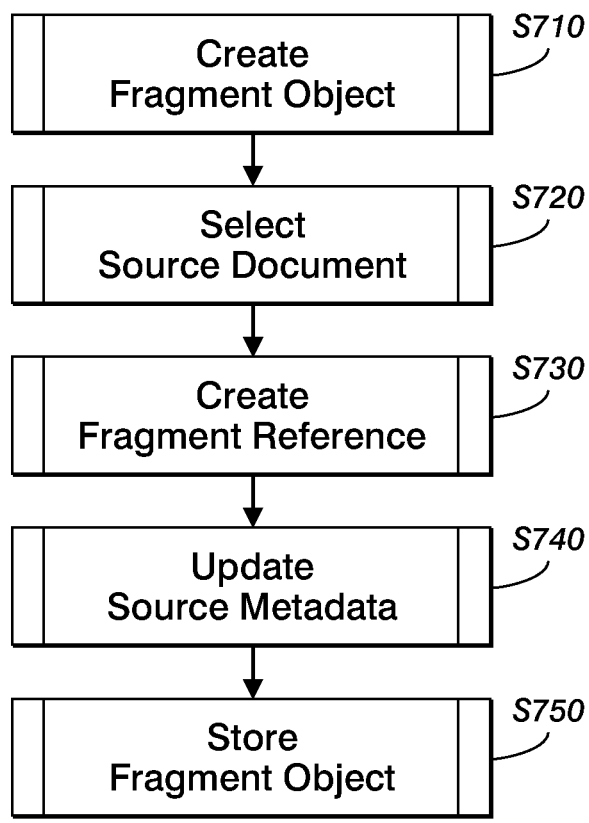
FIG. 7 is a flowchart describing a process for creating a fragment object.

In reference now to FIG. 7, a flowchart describing a process for creating a fragment object is illustrated. At Step S710, the creation of a fragment object is invoked from an object repository. It is noted that any conventional means may be used to invoke the creation of a fragment object.

At Step S720, information obtained from the user is used to select a source document from which a reference to a fragment thereof will be built. It is noted that any conventional means may be used to select the source document such as a file management system.

At Step S730, information obtained from the user is used to build a reference to a fragment of the source document. It is noted that any conventional means may be used to select the part of the document that will be the referenced fragment such as selecting text or selecting specific labeled sections of a document through a document editor.

At Step S740, the metadata of the source document is update. The metadata may be updated by simply incrementing a reference count. The metadata may also be updated by adding a reference to the fragment object to the metadata of the source object. It is noted that various presently unforeseen or unanticipated alternative means for updating the metadata may be devised by those skilled in the art and are also intended to be encompassed herein.

At Step S750 the data of the fragment object is stored in a document management system. The purpose of storing the fragment object is to enable the fragment object to persist so that the fragment object may be used until such time as the fragment object is no longer needed.

Figure 8:
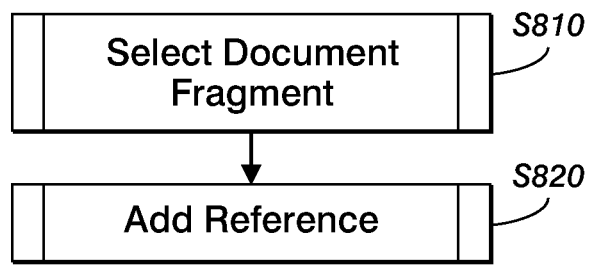
FIG. 8 is a flowchart describing a process for causing a referencing document to reference a document fragment.

In reference now to FIG. 8 a flowchart describing the process for causing a referencing document to reference a document fragment is illustrated. At Step S810 a document fragment is selected from a document management system. It is noted that any conventional means for selecting a document fragment may be used including a file management system wherein the stored data of the document fragment may be selected.

At Step S820 a reference to the document fragment is added to the referencing document. It is noted that any conventional means for incorporating a reference to the fragment object into a referencing document may be used.

Figure 9:
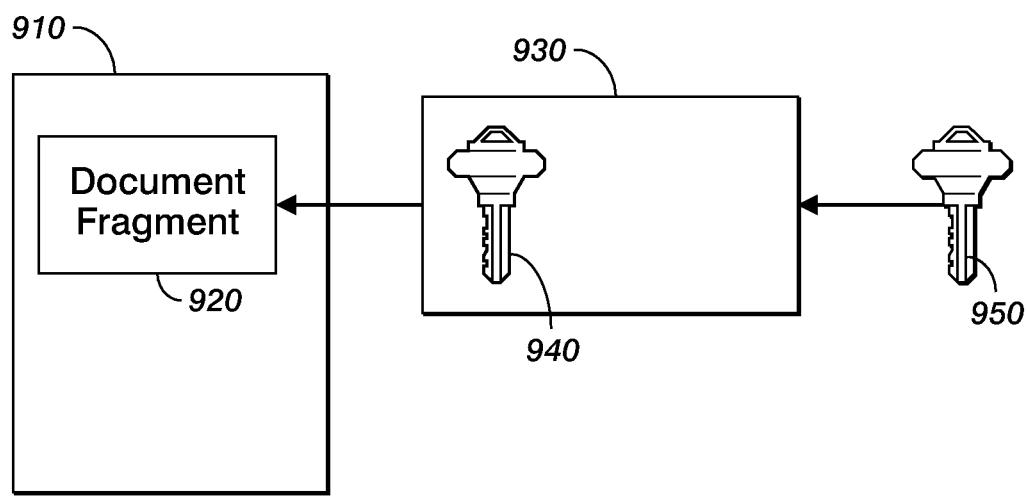
FIG. 9 is a block diagram illustrating a possible scenario for the use of encryption.

In reference now to FIG. 9, a block diagram depicting a possible scenario for the use of encryption is illustrated. Access control of documents and document fragments can be managed by controlling the encryption and decryption keys available to the users. An encrypted fragment object 930 is accessed by a user supplying a decryption key 950 available to that user. The encrypted fragment object 930 refers to a fragment 920 an encrypted source document 910. The encrypted fragment object 930 in turn uses its decryption key 940 to decrypt the fragment 920 encrypted source document

910. The encrypted fragment object 930 is then able to present the document fragment 920 to the user in an unencrypted form.

It is noted that an encryption algorithm or a decryption algorithm can be applied to a source document 910 or a fragment object 930. Further, if a decryption algorithm is applied to a source document 910 or fragment object 930 and the source document 910 or the fragment object 930 was not first encrypted, the decryption algorithm will return the unencrypted source document 910 or fragment object 930.

It is further noted that an encryption algorithm may be applied to a source document 910 or a fragment object 930 with a result that the source document 910 or fragment object 930 remains unencrypted because an identity encryption key is supplied that causes no encryption to take place. Making only an identity encryption key available to a user is a way to prevent unauthorized encryption of a document or a fragment object.

In summary, a method may generate a document by accessing a referencing document; invoking a fragment object referenced by the referencing document, the fragment object including a first set of data corresponding to a document fragment of a source document and a second set of data corresponding to a transformation of the document fragment of the source document; transforming the document fragment of the source document based on the second set of data; and incorporating the transformed data into the referencing document to generate a document.

The method may also generate a document by accessing a referencing document; invoking a fragment object referenced by the referencing document, the fragment object including a first set of data corresponding to a document fragment of a source document and a second set of data corresponding to a transformation of the document fragment of the source document; determining the format of the referencing document based on the second set of data; transforming the document fragment of the source document to correspond to the determined format of the referencing document; and incorporating the transformed document fragment of the source document into the referencing document to generate a document.

The method may further generate a document by accessing a referencing document; invoking a fragment object referenced by the referencing document, the fragment object including a first set of data corresponding to a document fragment of a source document, the fragment object including a second set of data corresponding to access to the document fragment of the source document; determining access credentials of a user; comparing the access credentials of the user with access criteria data in the second set of data corresponding to access to the document fragment of the source document; and incorporating the document fragment into the referencing document.

The fragment object may include a third set of data corresponding to a transformation of the document fragment of the source document such that the document fragment of the source document is transformed based on the third set of data when it is determined that the access credentials of the user correspond to access criteria data in the second set of data corresponding to access to the document fragment of the source document and the transformed document fragment is incorporated into the referencing document.

The method may further generate a document by accessing a referencing document; invoking a fragment object referenced by the referencing document, the fragment object including a first set of data corresponding to a document fragment of a source document, the fragment object including a second set of data corresponding to access to the document fragment of the source document; determining access credentials of a user; comparing the access credentials of the user with access criteria data in the second set of data corresponding to access to the document fragment of the source document; encrypting the document fragment of the source document when it is determined that the access credentials of the user fail to correspond to access criteria data in the second set of data corresponding to access to the document fragment of the source document; incorporating the document fragment into the referencing document when it is determined that the access credentials of the user correspond to access criteria data in the second set of data corresponding to access to the document fragment of the source document to generate a document; and incorporating the encrypted document fragment into the referencing document when it is determined that the access credentials of the user fail to correspond to access criteria data in the second set of data corresponding to access to the document fragment of the source document to generate a document.

The fragment object may include a third set of data corresponding to a transformation of the document fragment of the source document such that the document fragment of the source document is transformed based on the third set of data when it is determined that the access credentials of the user correspond to access criteria data in the second set of data corresponding to access to the document fragment of the source document; the transformed document fragment of the source document is encrypted when it is determined that the access credentials of the user fail to correspond to access criteria data in the second set of data corresponding to access to the document fragment of the source document; the transformed document fragment is incorporated into the referencing document when it is determined that the access credentials of the user correspond to access criteria data in the second set of data corresponding to access to the document fragment of the source document to generate a document; and the encrypted transformed document fragment is incorporated into the referencing document when it is determined that the access credentials of the user fail to correspond to access criteria data in the second set of data corresponding to access to the document fragment of the source document to generate a document.

A method may update a document fragment based upon changes in another document by accessing a referencing document; invoking a fragment object referenced by the referencing document, the fragment object including a first set of data corresponding to a document fragment of a source document; incorporating data from the document fragment into the referencing document to generate a document; changing the incorporated data of the document; invoking a fragment object referenced by the referencing document when the incorporated data of the document is changed; and modifying the document fragment of the source document to correspond to the change in the incorporated data of the document.

A method may also update a document fragment based upon changes in another document by accessing a referencing document; invoking a fragment object referenced by the referencing document, the fragment object including a first set of data corresponding to a document fragment of a source document, the fragment object including a second set of data corresponding to access to the document fragment of the source document; incorporating data of the document fragment into the referencing document to generate a document; changing the incorporated data of the document; determining access credentials of a user; comparing the access credentials of the user with access criteria data in the second set of data corresponding to access to the document fragment of the source document; invoking a fragment object referenced by the referencing document when the incorporated data of the document is changed and when it is determined that the access credentials of the user correspond to access criteria data in the second set of data corresponding to access to the document fragment of the source document; and modifying the document fragment of the source document to correspond to the change in the incorporated data of the document when it is determined that the access credentials of the user correspond to access criteria data in the second set of data corresponding to access to the document fragment of the source document.

A method may further update a document fragment based upon changes in another document by accessing a referencing document; invoking a fragment object referenced by the referencing document, the fragment object including a first set of data corresponding to a document fragment of a source document; incorporating data of the document fragment into the referencing document to generate a document; changing the incorporated data of the document; and modifying fragment object referenced by the referencing document to include a second set of data, the second set of data corresponding to the change in the incorporated data of the document.

A method may also generate a document by accessing a referencing document; invoking a fragment object referenced by the referencing document, the fragment object including a first set of data corresponding to a document fragment of a source document, the fragment object including a second set of data corresponding to access to the document fragment of the source document; incorporating data of the document fragment into the referencing document to generate a document; changing the incorporated data of the document; determining access credentials of a user; comparing the access credentials of the user with access criteria data in the second set of data corresponding to access to the document fragment of the source document; and modifying fragment object referenced by the referencing document to include a third set of data, the third set of data corresponding to the change in the incorporated data of the document when it is determined that the access credentials of the user correspond to access criteria data in the second set of data corresponding to access to the document fragment of the source document.

A method may preserve data associated with a document fragment of a document to be deleted by determining if a document is to be deleted includes a document fragment referenced by a fragment object, the fragment object including a first set of data corresponding to a document fragment of the document to be deleted and a second set of data corresponding to a transformation of the document fragment of the document to be deleted; replacing, in the fragment object, the first set of data corresponding to a document fragment of the document to be deleted with actual data of the document fragment of the document to be deleted when it is determined that the document to be deleted includes a document fragment referenced by a fragment object; and deleting the document to be deleted after the first set of data, in the fragment object, corresponding to a document fragment of the document to be deleted is replaced with the actual data of the document fragment of the document to be deleted.

A method may also preserve data associated with a document fragment of a document to be deleted by determining if a document is to be deleted includes a document fragment referenced by a fragment object, the fragment object including a first set of data corresponding to a document fragment of the document to be deleted and a second set of data corresponding to a transformation of the document fragment of the document to be deleted; copying actual data of the document fragment of the document to be deleted to a second document when it is determined that the document to be deleted includes a document fragment referenced by a fragment object; and replacing, in the fragment object, the first set of data corresponding to a document fragment of the document to be deleted with a reference to the document fragment of the second document.

A method may organize document fragments within a set of documents by identifying a first document fragment of a first document; identifying a second document fragment within the set of documents that is identical to the first document fragment of the first document; determining, from a set of fragment objects, whether one of the set of fragment objects has a set of data corresponding to the first document fragment of the first document; creating a new fragment object having a set of data corresponding to the first document fragment of the first document when it is determined that no fragment objects within the set of fragment objects have a set of data corresponding to the first document fragment of the first document; replacing the second document fragment with a reference to the created fragment object when it is determined that no fragment objects within the set of fragment objects have a set of data corresponding to the first document fragment of the first document; and storing the created fragment object in a memory device.

A method may also organize document fragments within a set of documents by identifying a first document fragment of a first document; identifying a second document fragment within the set of documents that is identical to the first document fragment of the first document; and replacing the second document fragment with a reference to a fragment object, the fragment object including the set of data corresponding to the first document fragment of the first document.

In the various methods discussed above, the transformation of the document fragment of the source document may be a translation of an original language of the document fragment of the source document into a language corresponding to a language of the referencing document, the original language of the document fragment of the source document being different from the language of the referencing document; a summarization of the document fragment of the source document; changing a visual characteristic of the document fragment of the source document, such as a font, an image size, color, and/or a three-dimensional effect; conversion of the document fragment of the source document into Extensible Markup Language format; encryption of the document fragment of the source document; and/or decryption of the document fragment of the source document.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating a document, comprising:
  (a) accessing a referencing document;
  (b) invoking a fragment object referenced by the referencing document, the fragment object including a first set of data corresponding to a document fragment of a source document and a second set of data corresponding to a transformation of the document fragment of the source document;
  (c) transforming the document fragment of the source document based on the second set of data;

(d) incorporating the transformed data into the referencing document to generate a document;
(e) changing the incorporated transformed data of the referencing document; and
(f) modifying the fragment object referenced by the referencing document to include a third set of data, the third set of data corresponding to the change in the incorporated transformed data of the referencing document.

2. The method as claimed in claim 1, wherein the transformation of the document fragment of the source document is a translation of an original language of the document fragment of the source document into a language corresponding to a language of the referencing document, the original language of the document fragment of the source document being different from the language of the referencing document.

3. The method as claimed in claim 1, wherein the transformation of the document fragment of the source document is a summarization of the document fragment of the source document.

4. The method as claimed in claim 1, wherein the transformation of the document fragment of the source document is a changing a visual characteristic of the document fragment of the source document.

5. The method as claimed in claim 4, wherein the changed visual characteristic of the document fragment is a font.

6. The method as claimed in claim 4, wherein the changed visual characteristic of the document fragment is size.

7. The method as claimed in claim 4, wherein the changed visual characteristic of the document fragment is color.

8. The method as claimed in claim 4, wherein the changed visual characteristic of the document fragment is a three-dimensional effect.

9. The method as claimed in claim 1, wherein the transformation of the document fragment of the source document is a conversion of the document fragment of the source document into Extensible Markup Language format.

10. The method as claimed in claim 1, wherein the transformation of the document fragment of the source document is an encryption of the document fragment of the source document.

11. The method as claimed in claim 1, wherein the transformation of the document fragment of the source document is a decryption of the document fragment of the source document.

12. The method as claimed in claim 1, wherein the first set of data includes a criterion corresponding to a location of the document fragment of the source document within a repository.

13. The method as claimed in claim 1, wherein the first set of data includes an address corresponding to a location of the document fragment of the source document.

14. A method for generating a document, comprising:
(a) accessing a referencing document;
(b) invoking a fragment object referenced by the referencing document, the fragment object including a first set of data corresponding to a document fragment of a source document and a second set of data corresponding to a transformation of the document fragment of the source document;
(c) determining the format of the referencing document based on the second set of data;
(d) transforming the document fragment of the source document to correspond to the determined format of the referencing document; and
(e) incorporating the transformed document fragment of the source document into the referencing document to generate a document.

15. The method as claimed in claim 14, wherein the transformation of the document fragment of the source document further translates an original language of the document fragment of the source document into a language corresponding to a language of the referencing document, the original language of the document fragment of the source document being different from the language of the referencing document.

16. The method as claimed in claim 14, wherein the transformation of the document fragment of the source document further changes a font characteristic of the document fragment of the source document.

17. The method as claimed in claim 14, wherein the transformation of the document fragment of the source document further changes a size characteristic of the document fragment of the source document.

18. The method as claimed in claim 14, wherein the transformation of the document fragment of the source document further changes a color characteristic of the document fragment of the source document.

19. The method as claimed in claim 14, wherein the transformation of the document fragment of the source document further encrypts the document fragment of the source document.

20. The method as claimed in claim 14, wherein the transformation of the document fragment of the source document further decrypts the document fragment of the source document.

* * * * *